(12) United States Patent
Eriksson

(10) Patent No.: US 8,148,649 B2
(45) Date of Patent: Apr. 3, 2012

(54) LEAD-THROUGH

(75) Inventor: Stellan Eriksson, Sollebrunn (SE)

(73) Assignee: Marie Wallman Eriksson, Sollebrunn (SE)

( * ) Notice: Subject to any disclaimer, the term of this patent is extended or adjusted under 35 U.S.C. 154(b) by 366 days.

(21) Appl. No.: 12/447,799

(22) PCT Filed: Oct. 31, 2007

(86) PCT No.: PCT/SE2007/050805
§ 371 (c)(1),
(2), (4) Date: May 21, 2009

(87) PCT Pub. No.: WO2008/054321
PCT Pub. Date: May 8, 2008

(65) Prior Publication Data
US 2010/0000045 A1    Jan. 7, 2010

(30) Foreign Application Priority Data

Oct. 31, 2006  (SE) ...................................... 0602301

(51) Int. Cl.
*H02G 3/18* (2006.01)
*F16L 19/00* (2006.01)
*F16L 39/00* (2006.01)

(52) U.S. Cl. .................... 174/650; 285/123.4; 285/124.1
(58) Field of Classification Search ...................... 16/2.1, 16/2.2; 174/67, 152 G, 153 G, 650, 151, 174/654, 656, 660, 663, 665, 668; 248/56; 285/123.2, 123.4, 124.1, 124.4
See application file for complete search history.

(56) References Cited

U.S. PATENT DOCUMENTS

| | | | |
|---|---|---|---|
| 3,244,802 A * | 4/1966 | Sturtevant et al. | ........ 174/153 G |
| 3,564,113 A * | 2/1971 | Kindler | ........................ 174/656 |
| 4,289,288 A | 9/1981 | Gransberry et al. | |
| 5,144,777 A * | 9/1992 | Fishel et al. | .................... 52/144 |
| 2006/0001261 A1 | 1/2006 | Miyajima et al. | |
| 2007/0143956 A1* | 6/2007 | Kumakura et al. | .............. 16/2.2 |

FOREIGN PATENT DOCUMENTS

DE         4438057        12/1995
* cited by examiner

*Primary Examiner* — Timothy Thompson
*Assistant Examiner* — Roshn Varghese
(74) *Attorney, Agent, or Firm* — Lowe Graham Jones PLLC

(57) ABSTRACT

The present invention concerns a lead-through, especially a cabinet lead-through used in connection with dishwashers. The lead-through has two parts, a body and a cover. Both the body and the cover have part openings forming cylindrical openings when the cover is received on the body. The cylindrical openings formed may e.g. receive tubes for water and wastewater and an electric cable.

11 Claims, 4 Drawing Sheets

LEAD-THROUGH

PRIORITY CLAIM

This application is a national phase of PCT/SE 2007/050805 filed Oct. 31, 2007, which claims priority to Swedish Application Serial No. 0602301-4 filed Oct. 31, 2006, the contents of which are hereby incorporated by reference.

TECHNICAL FIELD

The present invention concerns a lead-through, especially a cabinet lead-through.

PRIOR ART

In this description the lead-through is mainly described in connection with dishwashers. However, a person skilled in the art realises that it may be used with other appliances as well.

In most kitchens today a dishwasher is included. The dishwasher is often placed inside a kitchen cabinet and has one conduit for incoming water, one conduit for wastewater and one conduit for electricity. If the dishwasher is placed in a cabinet these conduits has to be lead through the bottom or a wall of the kitchen cabinet receiving the dishwasher. Previously separate openings for the water inlet and outlet and the electrical cable has normally been made. This is often both cumbersome and time consuming. Normally, an automatic shut-off valve for the water is also arranged and has to be taken through the bottom or wall of the cabinet.

The openings for the different conduits of the dishwasher are either made in connection with the manufacture of a special cabinet intended for a dishwasher or when the dishwasher is to be installed in the kitchen.

As the incoming water normally is feed intermittently the tube for the incoming water will be exposed to pressure surges. Thus, the water tube will have a tendency to move and the lead-through should be able to take up such movements of the water tube.

In some instances a cabinet is to receive pipes for an additional tapping point. In such cases the cabinet will normally receive two sets of pipes for hot and cold water, respectively. Thus, a total of four pipes are received in such a cabinet.

SUMMARY OF THE INVENTION

The present invention is based on the idea that the lead-through should easily be put in place in a bottom or wall of a kitchen cabinet and fixed to the cabinet with a simple snap function, i.e. without the use of screws, nails, adhesive or the like. A hole cutter is used to make a hole for the cabinet lead-through. The size of the lead-through is adapted to the size of a standardized hole cutter for connection boxes. A general ambition has been to have a lead-through that is easy to use, both regarding mounting and storage, and that is not too expensive.

The lead-through of the present invention may be pre-mounted in a cabinet in the factory or may be retrofitted in a kitchen cabinet already in place in a kitchen.

Further objects and advantages of the present invention will be obvious to a person skilled in the art when reading the detailed description below of at present preferred embodiments.

BRIEF DESCRIPTION OF THE DRAWINGS

The invention will be explained further below by way of example and with reference to the enclosed drawings. In the drawings.

DETAILED DESCRIPTION OF PREFERRED EMBODIMENTS

Figure 1:
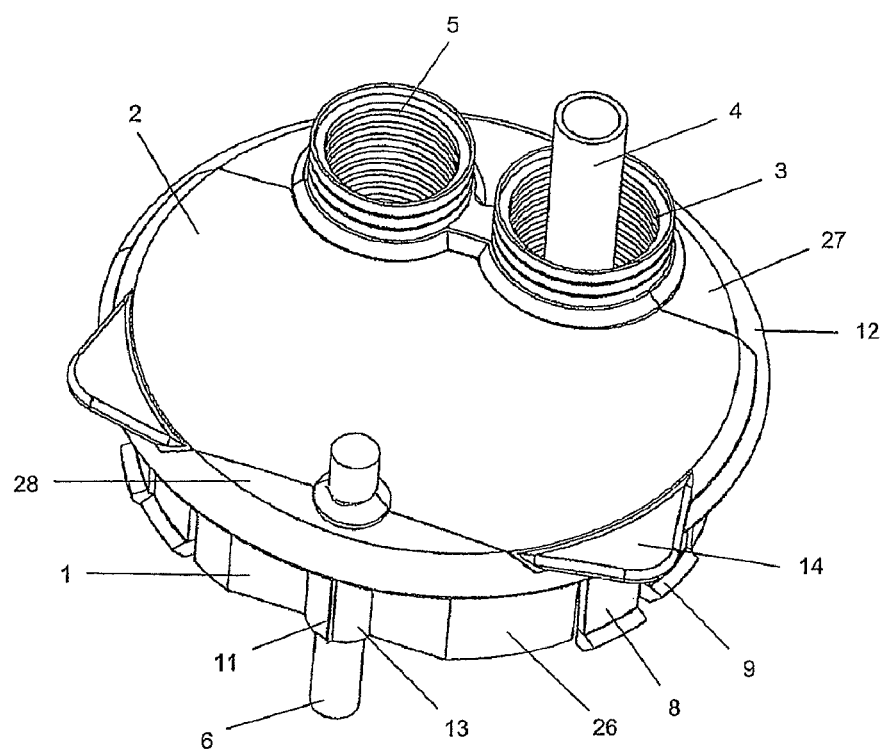
FIG. 1 is a perspective view of a first embodiment of a cabinet lead-through according to the present invention, with conduits for water, wastewater and electricity indicated.
Figure 2:
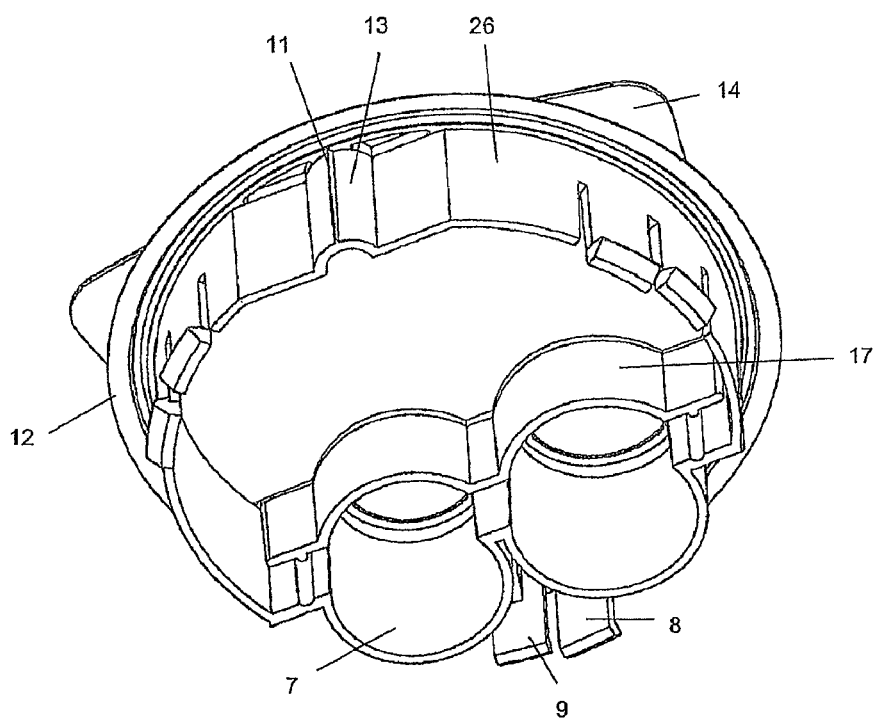
FIG. 2 is a perspective view of the lead-through of FIG. 1 seen from the opposite direction and without any conduits for water, wastewater or electricity indicated.
Figure 3:
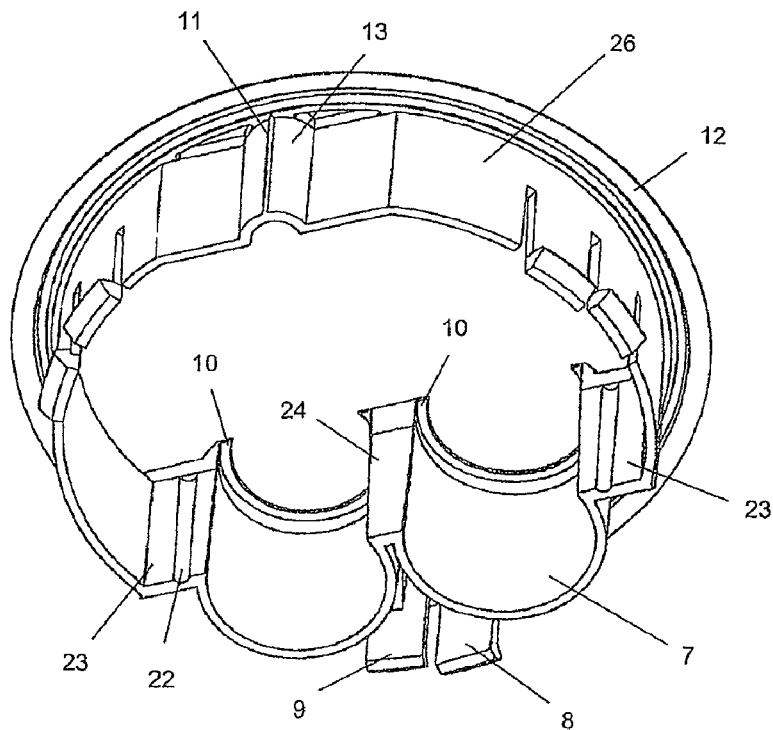
FIG. 3 is a perspective view from below of a body forming a part of the lead-through of FIG. 1.
Figure 4:
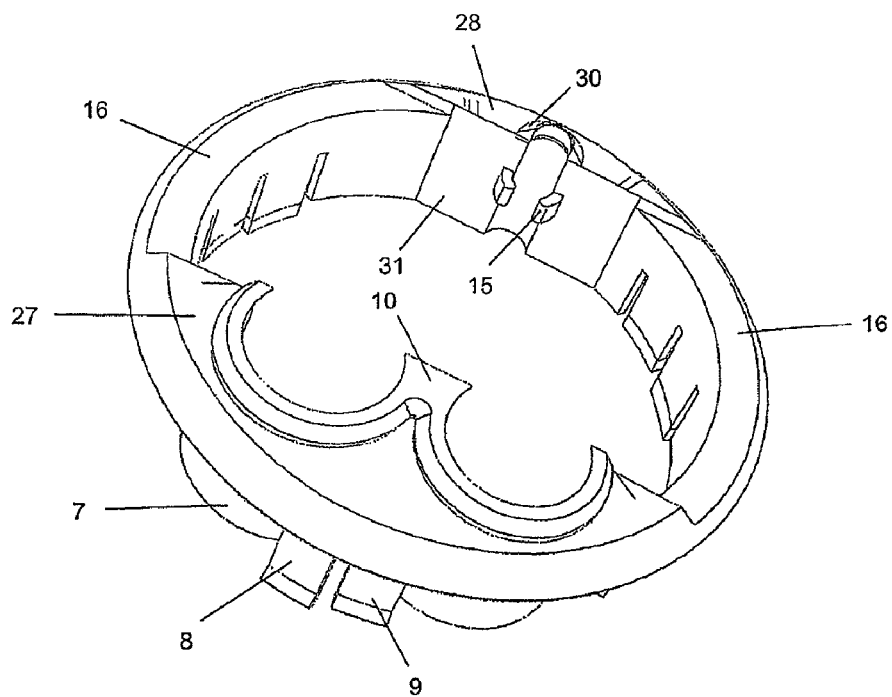
FIG. 4 is a perspective view from above of the body of the lead-through of FIG. 3.
Figure 5:
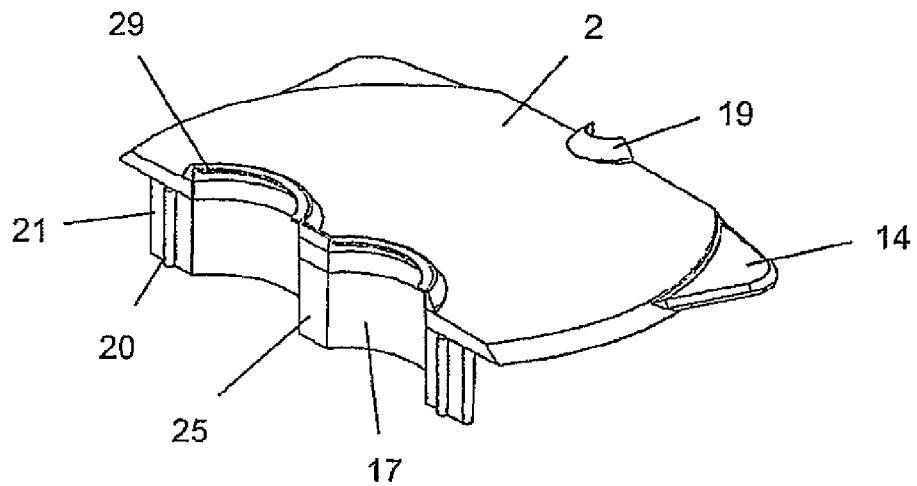
FIG. 5 is a perspective view from above of a cover forming a part of the cabinet lead-through of FIG. 1.
Figure 6:
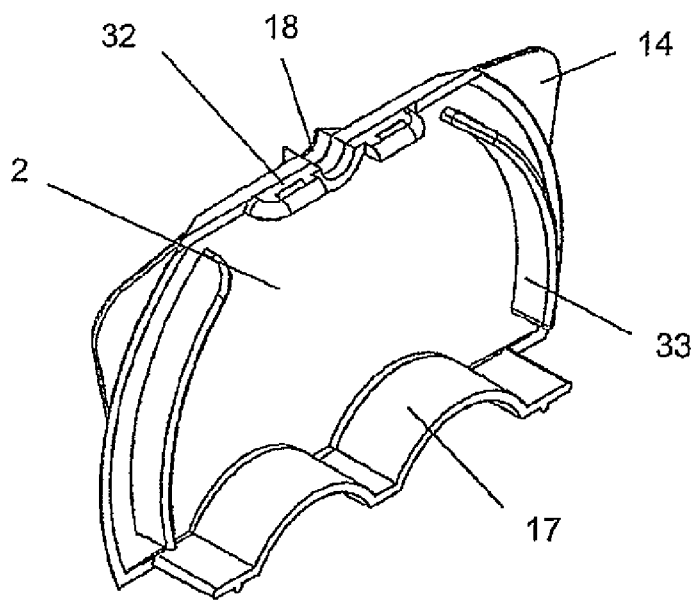
FIG. 6 is a perspective view from below of the cover of FIG. 5.
Figure 7:
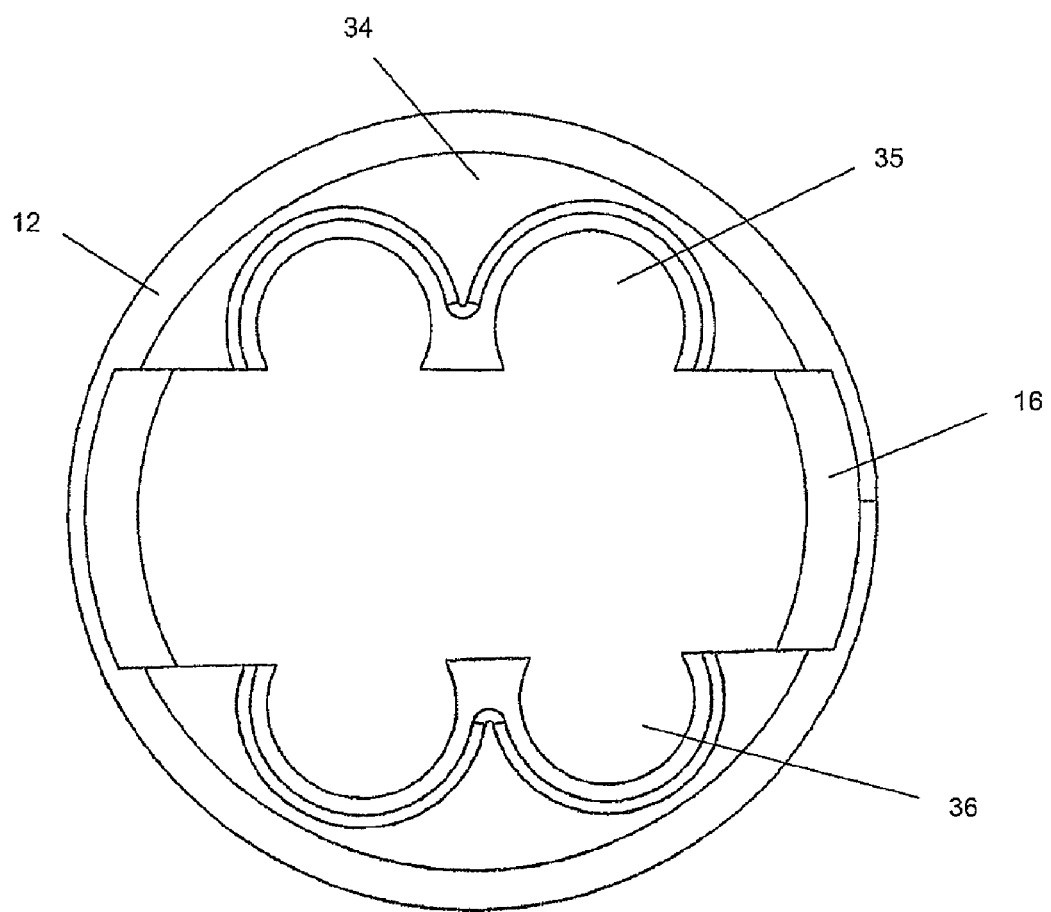
FIG. 7 is a plan view of a body of a second cabinet lead-through according to the present invention.

In FIGS. 1-7 a first example of a cabinet lead-through according to the present invention is shown. A second example of a cabinet lead-through according to the present invention is indicated in FIG. 8. Corresponding parts of the two shown embodiments normally have the same reference numerals and will only be explained in connection with the first embodiment. A person skilled in the art realises that the exact form of such common parts may vary somewhat between the two embodiments.

A cabinet lead-through according to a first embodiment of the present invention has two parts, a body 1 and a cover 2 to be received on the body 1. In FIG. 1 an outer water tube 3, an inner water tube 4, a wastewater tube 5 and an electrical cable 6 are indicated. These tubes 3-5 and cable 6 are only indicated to illustrate one possible use of the cabinet lead-through and do not form any part of the present invention as such.

The body 1 has a generally cylindrical outer surface 26, two upper surfaces 27, 28 and a rim 12. As used in this description the expression "upper" in connection with the cabinet lead-through is the side, which normally is to face the inside of the cabinet. As used in this description the expression "axial" and similar expressions are in relation to the tubes and cables to be received in the lead-through of the present invention.

The body 1 of the cabinet lead-through has two part openings 7, placed side-by-side, to receive the water and wastewater tubes 3-5. The openings formed by the part openings 7 should have an inner diameter that is slightly less than the outer diameter of the tubes 3, 5 to be received. Furthermore, the upper portion of each part opening 7 has an edge 10 in circumferential direction. The edges 10 of the part openings 7 may be made in a softer, more elastic material, but in some embodiments the edges 10 are made of the same material as the rest of the body 1. The smaller diameter and the edge 10 assist in retaining the tubes in a secure way and to seal against the tubes. The part openings 7 form parts of cylinders and extend the entire height of the cylindrical surface 26 of the body 1.

Pairs of tongues 8, 9 are evenly distributed around the cylindrical surface 26 of the body 1. The tongues 8, 9 have a protruding edge at the free ends of the tongues 8, 9 to snap around an edge of a hole receiving the cabinet lead-through in a bottom or wall of a cabinet. In the shown embodiment three pairs of tongues 8, 9 are shown, but a person skilled in the art realises that other numbers of pairs may be used. The two tongues 8, 9 of each pair are of different lengths. By having tongues 8, 9 of different lengths it is possible to use the same cabinet lead-through for two different standard thicknesses of the bottom or walls of kitchen cabinets. By means of the tongues 8, 9 the cabinet lead-through may be securely fixed to a bottom or wall of a cabinet by means of a snapping action. Thus, no nails, screws or adhesive is needed.

To avoid that the lead-through is turned inside the hole a number of locking ridges 11 are arranged protruding from the circumference, i.e. the cylindrical surface 26, of the body 1. The locking ridges 11 have an axial extent and are to abut the sides of the opening receiving the lead-through.

On the side opposite the part openings 7 for the water and wastewater tubes 3-5 a further part opening 13 is arranged. This part opening 13 is to receive the electrical cable 6 and extends all of the height of the cylindrical surface 26 of the body 1. A cable retainer 15 is placed about in the middle of the part opening 13. In the same way as for the other part openings 7 an edge 30 is arranged at the upper end of the part opening 13 to receive the electrical cable 6 and also this edge 30 may be made of a softer and more elastic material.

The generally cylindrical surface 26 of the body 1 is interrupted at the part openings 7, 13.

The part openings 7 for the different water tubes open at one of the upper surfaces 27 of the body 1. The part opening 13 for the electrical cable 6 opens at the other upper surface 28 of the body 1. The upper surfaces 27, 28 are arranged at opposite sides to each other and the body 1 is open between the upper surfaces 27, 28. Both upper surfaces 27, 28 have the form of segments of a circle, interrupted by the part openings 7, 13. One straight side of each upper surface 27, 28 coincides with the free ends of the part openings 7, 13 and the other side of each upper surface 27, 28 coincides with the rim 12 of the body 1.

On the upper part of body 1 of the cabinet lead-through two recessed parts 16 are arranged along the rim 12 of the upper part. The rim 12 of the upper part projects outside the cylindrical surface 26. The recessed parts 16 are arranged at opposing parts of the rim 12. The cover 2 is adapted to be received in the recessed parts 16 of the rim 12 of the body 1.

The cover 2 has two part openings 17 at one side and one part opening 18 at the opposite side of the cover 2. The part openings 17, 18 form parts of cylinders. The part openings 17, 18 of the cover 2 and the part openings 7, 13 of the body 1 are adapted to each other in such a way that when the cover 2 is received at the top of the body 1 three cylindrical through openings are formed. In the shown embodiment the part openings 17, 18 of the cover 2 does not extend the fall height of the part openings 7, 13 of the body 1. However, a person skilled in the art realises that in other embodiments the part openings 17, 18 of the cover 2 may have the same extension as the part openings 7, 13 of the body 1. In the same way as for the body 1, the part openings 17, 18 of the cover have edges 19, 29 at the upper surface. The edges 19, 29 are to abut the tubes and cables received. The edges 19, 29 may be made of a different, softer, more elastic material than the rest of the lead-through to enhance sealing.

Contact surfaces 23, 24, 31 with an axial extension are formed on the body 1 on both sides of each part opening 7, 13. Corresponding contact surfaces 21, 25, 32 with an axial extension are formed on the cover 2. The contact surfaces 21, 23-25, 31, 32 of the body 1 and the cover, respectively, are to abut each other when the cover 2 is received on top of the body 1. On the cover surfaces 21, 23, outside the part openings 7, 17 for the water and wastewater tubes, co-operating strips 20 and grooves 22 are arranged. The strips 20 are to be received in the grooves 22. Even though the strips 20 are shown arranged on the contact surfaces 21 of the cover 2 and the grooves 22 on the contact surfaces 23 of the body 1, a person skilled in the art realises that the strips and grooves may be arranged on either of the body 1 and the cover 2.

The cover 2 has two lugs 14 to enhance manageability. The lugs 14 project outside the rim 12 of the body 1, when the cover 2 is received. The lugs 14 are arranged at the side of the cover 2 closest to the part opening 18 for the electrical cable 6. Furthermore, the cover 2 has two rails 33 on the lower side, which rails 33 have a curvature adapted to the curvature of the cylindrical surface 26 of the body 1. The rails 33 are placed at opposite sides of the cover 2 close to the parts to be received in the recess parts 16 of the rim 12 of the body 1. The rails 33 assist in controlling the position of the cover 2 on the body 1.

The upper surface of the cover 2 and the body 1 is slightly domed, to facilitate for possible water to flow off more easily. In the second embodiment of the cabinet lead-through indicated in FIG. 8 there are openings for four pipes. In the same way as for the first embodiment this cabinet lead-through has two main parts a body 34 and a cover (not shown). In this embodiment no electrical cable is to be received.

The body 34 has four part openings 35, 36, placed two and two side-by-side. The two pairs of part openings 35, 36 are placed opposite each other on opposite sides of the opening to receive the cover. A person skilled in the art realises that the cover has the same general design as the cover of the previous embodiment. The only difference being that it is adapted to another number of openings. Thus, in this case the cover has four part openings arranged for cooperation with the part openings 35, 36 of the body 34. When the cover is placed on the body 37 four openings will be formed.

In another embodiment the cover and body are furnished with co-operating rails and grooves, which means that the cover is to be slid into place on the body.

If the water tubes or wastewater tubes 3-5 have a smaller outer diameter than the inner diameters of the cylindrical openings formed, a rubber bushing may be placed in the cylindrical openings. The rubber bushings may be placed in circular flanges on the lower side of the cover and are adapted to tubes of different diameters. If needed the suitable rubber bushing is taken out of the flange and is placed in the appropriate opening, i.e. the opening receiving a tube having an outer diameter which is smaller then the inner diameter of the opening.

If the lead-through is pre-mounted in a cabinet a further cover may be arranged covering the cylindrical openings. It is also possible to arrange an outer cover to be placed on the cabinet lead-through before receiving any tubes and which will function as a dust cover both in possible transport and after mounting of the lead-through. The outer cover may have a number of guide flanges adapted to be received inside the part openings 7, 17 of the body 1 and cover 2, respectively, to receive tubes 3, 4, 5. Furthermore, a guide pin may be adapted to be received in the other part openings 13, 18 of the body 1 and cover 2, respectively, to receive an electric cable 6. Thus, the outer cover is kept in place on the cabinet lead-through by the co-operation between the guide flanges, the guide pin and the different part openings 7, 13, 17, 18. The outer cover is used if no tubes or cables are to be received or before such tubes or cables are received. A person skilled in the art realises that a corresponding outer cover can be used also with the second example of a cabinet lead-through. When the lead-through is installed it is beneficial if the electrical cable 6 is placed adjacent a wall of the cabinet to minimize the risk that it will be cut off, if large and or heavy articles are placed in the cabinet.

When the lead through is to be installed a standardized hole cutter is used to make a hole, normally in the bottom of a kitchen cabinet. The bottom 1 of the lead-through is then pushed into the hole and snapped into place by means of the tongues 8 or 9 having protruding edges. Without the cover 2 in place tubes 3-5 for water and waste-water are placed in the appropriate part openings 7 of the body 1. The outer water tube 3 and the wastewater tube 5 are placed in the part openings 7 by gently compressing the tubes 3, 5 a short distance. At the same time as the tubes 3, 5 are placed in the part openings an automatic shut-off valve is normally passed through the opening of the body 1 of the lead-through. Thus, the opening receiving the cover 2 has to be big enough to enable the automatic shut-off valve to pass. The electrical cable 6 is then received in the part opening 13 arranged for it, and the electrical cable 6 is also snapped into the cable retainer 15. Preferably, the lead-through is placed with the part opening 13 for the electrical cable 6 adjacent a wall of the cabinet, as the electrical cable is most sensitive for a possible break. Finally the cover 2 is placed on the body 1.

The invention claimed is:

1. A lead-through formed of a body and a cover wherein the body and cover each has a number of partial openings, the body comprising a generally cylindrical outer surface with an axial extension and a rim at one side of the cylindrical surface protruding outside the cylindrical surface, wherein the rim has two recessed parts arranged opposite each other, wherein the cover is received in the recessed parts of the rim of the body, wherein the partial openings of the cover form cylindrical through-openings with the partial openings of the body when the cover is received on the body, wherein the body has an axial contact surface and the cover has an axial contact surface, and wherein the axial contact surface of the body abuts the axial contact surface of the cover when forming the cylindrical through-openings.

2. The lead-through of claim 1, wherein the body has tongues with protruding edges at free ends to give a snap locking of the lead-through in a through opening receiving the lead-through and which tongues are evenly spaced around the cylindrical surface and wherein the cylindrical surface is furnished with a number of axial edges extending the total length of and protruding outside the cylindrical surface.

3. The lead-through of claim 1, wherein the body has two partial openings arranged side-by-side and one partial opening arranged opposite the first two partial openings, and which partial openings have an axial extension.

4. The lead-through of claim 3, wherein the body has two opposite, upper surfaces at the partial openings, each surfaces having the form of a segment of a circle and having one side coinciding with the free ends of the partial openings and one side coinciding with the rim.

5. The lead-through of claim 4, wherein the upper surface, formed of the cover and the upper surfaces of the body, is doomed.

6. The lead-through of claim 3, wherein the two partial openings arranged side-by-side are extended the whole height of the cylindrical surface and have a larger diameter than the opposite arranged partial opening and wherein a cable retainer is arranged in connection with the smaller partial opening.

7. The lead-through of claim 6, wherein two lugs are arranged opposite each other at the same side of the cover at which the smaller partial opening is arranged and wherein the lugs project outside the rim of the body.

8. The lead-through of claim 1, wherein the body has two pairs of partial openings, which partial openings in each pair are arranged side-by-side, wherein the two pairs of partial openings are arranged opposite each other, and wherein the partial openings have an axial extension and wherein the cover has partial openings arranged to form cylindrical through openings with the partial openings of the body, when the cover is received on the body.

9. The lead-through of claim 8, wherein the body has two opposite, upper surfaces at the partial openings, each surface having the form of a segment of a circle and having one side coinciding with the free ends of the partial openings and one side coinciding with the rim.

10. The lead-through of claim 1, wherein an edge projecting inwardly is arranged at one end of all partial openings and wherein said edges are made of a more soft and elastic material than the rest of the lead-through.

11. The lead-through of claim 1, wherein axial contact surfaces are arranged at the partial openings in such a way that contact surfaces of the body will abut contact surfaces of the cover when the cover is received on the body and wherein a number of axial strips on one or more contact surfaces are received in axial grooves of an opposite contact surface.

* * * * *